Patented June 16, 1931

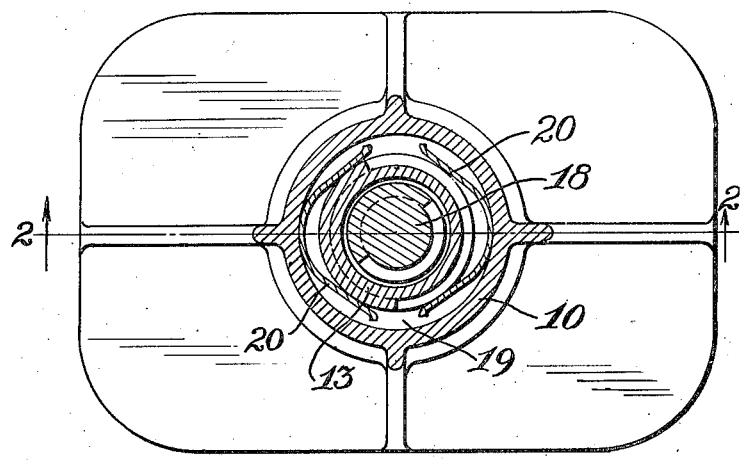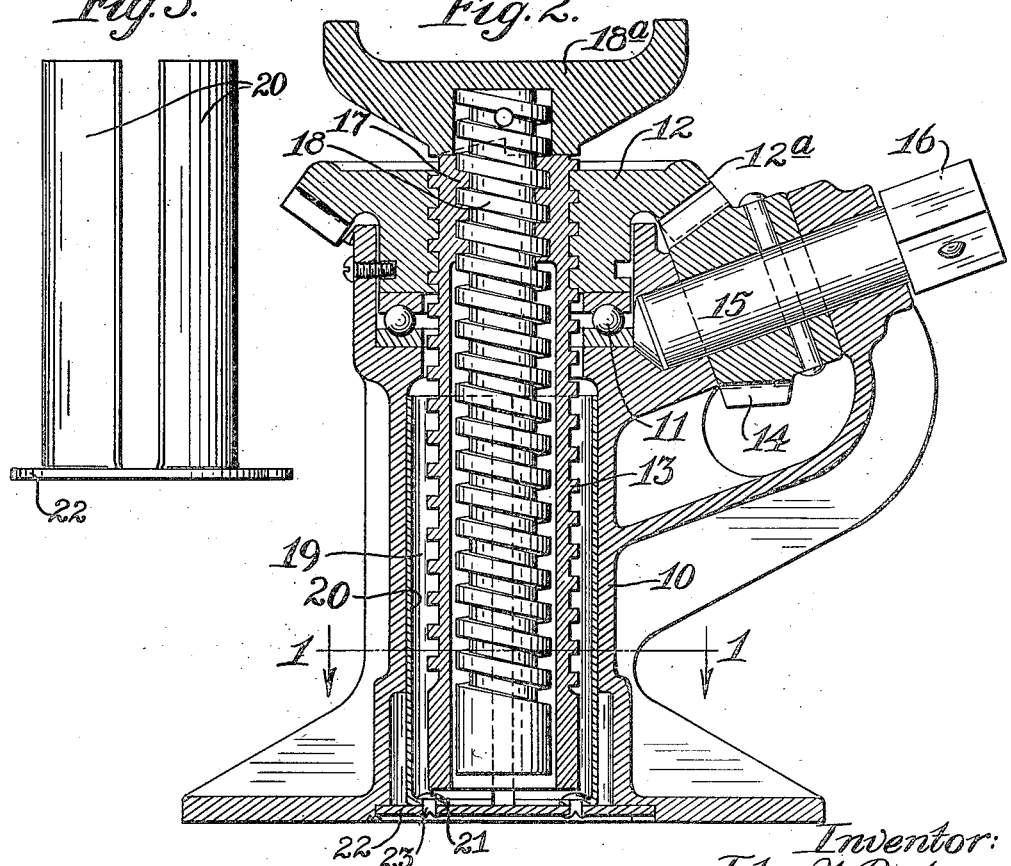

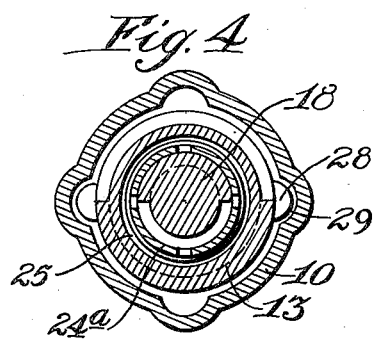
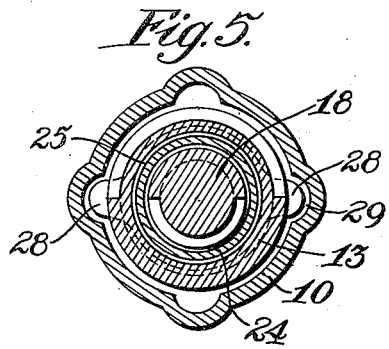
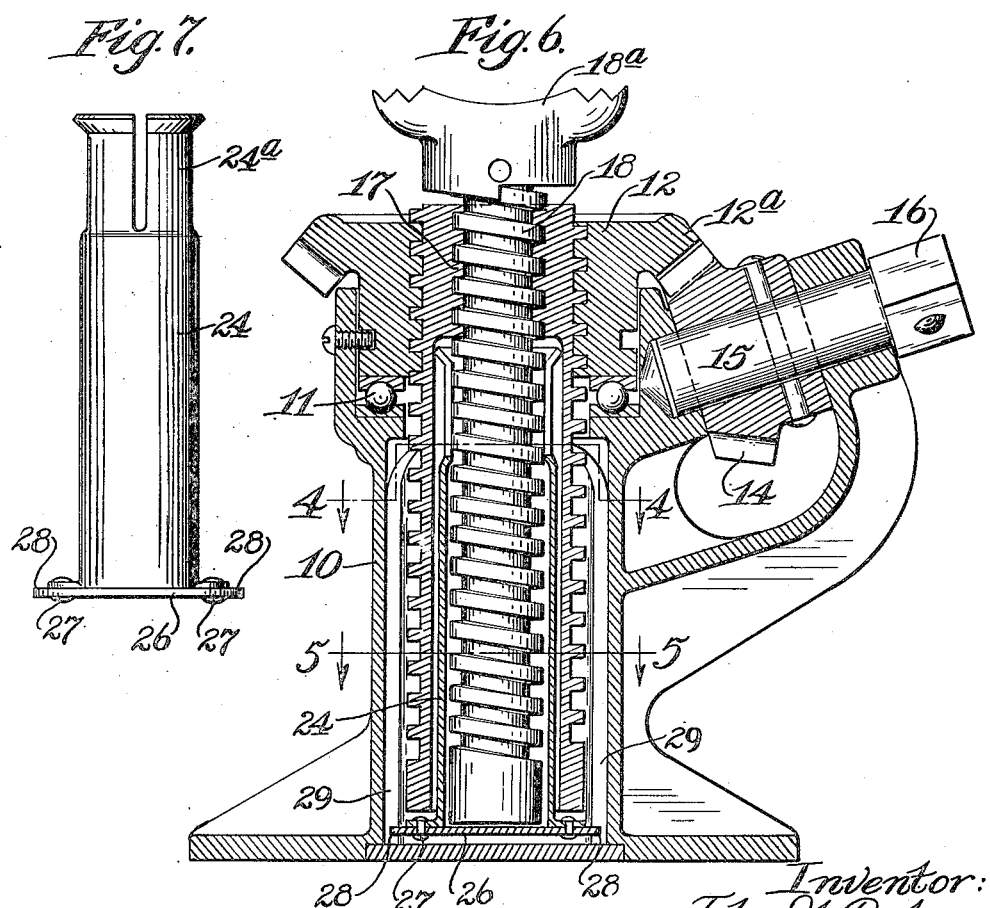

1,810,118

UNITED STATES PATENT OFFICE

JOHN W. BATE, OF RACINE, WISCONSIN, ASSIGNOR TO WALKER MANUFACTURING COMPANY, OF RACINE, WISCONSIN, A CORPORATION OF WISCONSIN

SCREW JACK

Application filed February 12, 1927. Serial No. 167,703.

This invention relates to screw jacks and particularly to double lift screw jacks for use on automobiles especially such as are equipped with balloon tires.

The invention is fully described in the following specification and shown in the accompanying drawings, in which:

Figure 1 is a transverse section on the line 1—1 of Fig. 2;

Fig. 2 is a vertical sectional view on the line 2—2 of Fig. 1;

Fig. 3 is a side elevation of the sheet metal friction member removed from the jack;

Figs. 4 and 5 are transverse sections on the line 4—4 and 5—5 of Fig. 6;

Fig. 6 is a view similar to Fig. 2 showing a modified form of the invention; and Fig. 7 is a side elevation of the sheet metal friction sleeve used with the jack shown in Fig. 6.

The embodiment illustrated in Figs. 1 to 3 inclusive comprises a housing or casing 10 which is hollow and counterbored at its upper end to receive a ball thrust bearing 11 upon which rests a nut 12 which is internally threaded to receive the hollow outer screw 13 which is externally threaded to mesh with the threads in said nut.

The nut 12 carries a bevel gear 12ª which meshes with a bevel pinion 14 which is pinned upon a shaft 15 which is journaled in suitable bearings in the housing 10 and has a squared outer end 16 which is adapted to receive a suitable crank or the like for turning the same.

The upper end of the outer screw member 13 is provided with internal screw threads 17 which are adapted to be engaged by the threads of the internal screw threads 18, which carries the usual saddle 18ª.

I have provided a space 19 (Fig. 1) between the casing 10 and the outer screw member 13. Into this space I have inserted a pair of resilient steel friction members 20 which apply friction upon the outer surfaces of the outer screw member for a purpose which will be hereinafter explained. These members preferably bear along their center, as shown in Fig. 1, against the inner wall of the casing 10 and have at their bottoms inwardly turned ears 21 which are secured to the bottom cover plate 22 by means of rivets 23. It will be understood, of course, that if desired, these friction members 20 may be entirely supported from the cover 22 so that they will not require any bearing upon the inner wall of the space 19.

The operation of this jack is as follows: Starting with the various parts in the "down" position shown in Fig. 2, turning the shaft 15 in a direction to raise the jack will cause the nut 12 to be turned while the outer screw member 13 is prevented from turning by the friction members 20. Consequently both screw members will continue to lift until the saddle 18ª encounters the load to be lifted, such as an axle of an automobile. As soon as this load is encountered it becomes a question of the relative amounts of friction on the two screw members 13 and 18 as to which one will move with respect to the other at any given instant.

It will thus be seen that the function of the friction members 20 is to hold the outer screw member against rotation so as to cause it to raise or lower when no load is applied thereto. Its useful function ceases during the time a load is being raised or lowered, as it is immaterial which screw then moves first.

The form of jack shown in Fig. 6 is quite similar both in construction and operation to that shown in Fig. 2 so that the reference numerals 10 to 18ª inclusive have been repeated.

In this form, a sheet metal sleeve 24 as shown in Fig. 7, is inserted into the space 25 which lies between the inner and outer screw members. The upper end of the sleeve 24 is somewhat reduced at 24ª so as to cause it to grip the inner screw member 18. The lower end of this sleeve is secured to a plate 26 by means of rivets 27. This plate is provided with laterally extending fingers 28 which are adapted to slide in vertical grooves 29 within the housing.

It will be understood from the foregoing, that when the shaft 15 of Fig. 6, is turned in a direction to raise the jack screw, the friction applied to the inner screw 18 will prevent it from turning and thus will cause a relative movement between this screw member and the nut 12 which will produce a lifting movement of the former. It matters little whether the outer screw member 13 turns with the nut 12 or is held stationary by the inner screw member 18. The essential thing is that one or both of these screw members will be held substantially against rotation while the nut is rotated until such a time as the saddle 18ª encounters the load to be lifted. During the lifting operation when the load is actually in contact with the saddle 18ª, the action of the sleeve 24 on the inner screw member is of little consequence as this inner screw member is then positively held by the load itself.

If the inner screw member lifts in advance of the outer screw member, the inner screw member will be withdrawn from the sleeve 24, since the plate 26 would strike the bottom of the outer screw member 13. As both are lifted however the sleeve 24 clinging to the inner screw member 18 will be carried up with it and as it does so the extensions 28 will be guided in grooves 29.

While I have shown and described but two embodiments of this invention, it is to be understood that it is capable of many modifications. Changes therefore in the construction and arrangements may be made which do not depart from the spirit and scope of the invention as disclosed in the appended claims.

I claim:

1. In a double screw jack, a casing, a nut revolubly mounted thereon, means for turning said nut, a hollow outer screw member threaded in said nut and having internal threads, an inner screw member threaded into said internal threads, a sheet metal member extending into the space about one of said screws and having a friction bearing thereon to cause said screw to move longitudinally with respect to said nut as it is turned, and a cap for closing the bottom of said jack, said sheet metal member being secured to said cap.

2. In a double screw jack, a casing, a nut revolubly mounted thereon, means for turning said nut, a hollow outer screw member threaded in said nut and having internal threads, an inner screw member threaded into said internal threads, a yieldable sheet metal friction means connected at its lower end to said casing and having vertical sides adapted to apply friction to the outer surface of one of said screw members to cause it to move longitudinally when said nut is turned.

3. In a double screw jack, a casing, a nut revolubly mounted thereon, means for turning said nut, a hollow outer screw member threaded in said nut and having internal threads, an inner screw member threaded into said internal threads, and yieldable means for resisting the rotation of said outer screw, said means comprising a tubular member having its base portion connected to said casing and having vertical sides adapted to engage one of said screw members.

4. In a double screw jack, a casing, a nut revolubly mounted thereon, means for turning said nut, a hollow outer screw member threaded in said nut and having internal threads, an inner screw member threaded into said internal threads, and a vertically disposed friction member connected at one of its ends to the lower portion of the casing and having its sides extending along one of said screw members in frictional contact therewith and serving to cause said screw member to move longitudinally when said nut is turned.

5. In a double screw jack, a casing providing a screw chamber, a driving member revolubly mounted thereon, means for rotating said driving member, a hollow outer screw member threaded in said driving member and having internal threads, an inner screw member engaging said internal threads, a split sleeve member connected at one end to the casing and having the free edges of its sides engaging the outer screw to cause said screw to move longitudinally with respect to said driving member when said driving member is operated.

6. In a double screw jack, a casing providing a screw chamber, a nut revolubly mounted on said casing, means for turning said nut, a hollow outer screw member threaded in said nut and having internal threads, an inner screw member threaded into said internal threads, a longitudinally disposed friction member adapted to bear against one of said screws, a base plate connected to said friction member and supporting it in operable position, and means for securing said base plate to said casing.

In testimony whereof I have hereunto set my hand this 2nd day of February, 1927.

JOHN W. BATE.